United States Patent [19]

Skelly

[11] Patent Number: 4,902,027
[45] Date of Patent: Feb. 20, 1990

[54] ALL TERRAIN DOLLY FOR WHEELED DEVICES

[76] Inventor: Billie J. Skelly, 1100 28th Ave. N., Naples, Fla. 33940

[21] Appl. No.: 222,025

[22] Filed: Jul. 21, 1988

[51] Int. Cl.$^4$ .................... B62D 39/00; B62D 61/06; B62B 3/00
[52] U.S. Cl. ................ 280/33.998; 280/7.1; 280/47.371; 280/62; 280/79.4
[58] Field of Search ...... 280/33.998, 47.331, 280/47.371, 79.6, 79.11, 79.4, 7.1, 7.17, 401; 180/198

[56] References Cited

U.S. PATENT DOCUMENTS

| | | | |
|---|---|---|---|
| 454,174 | 6/1891 | Martin et al. | 280/47.37 R |
| 2,463,744 | 3/1949 | Clemens | 280/62 |
| 2,628,847 | 2/1953 | Hawkins | 280/47.34 |
| 2,657,938 | 11/1953 | Browne et al. | 280/62 |
| 3,173,396 | 3/1965 | Bradov | 280/47.38 |
| 3,829,113 | 8/1974 | Epelbaum | 280/47.34 X |
| 4,538,829 | 9/1985 | Horowitz | 280/47.13 B X |
| 4,717,168 | 1/1988 | Moon, Sr. | 280/47.37 R X |
| 4,781,397 | 11/1988 | Burn | 280/47.13 B X |

FOREIGN PATENT DOCUMENTS 209888  1/1924  United Kingdom ......... 280/47.37 R

Primary Examiner—Charles A. Marmor
Assistant Examiner—Brian Johnson
Attorney, Agent, or Firm—Charles J. Prescott; Raymond H. Quist

[57] ABSTRACT

A dolly having large surface bearing area wheels has a frame upon which a wheeled device with wheels having insufficient surface bearing area for the terrain desired to be traversed can be supported. The dolly has a handle for propelling it. The structure may be built with provision for folding it to a more compact form.

6 Claims, 3 Drawing Sheets

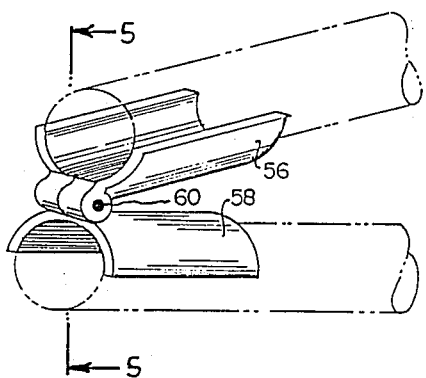
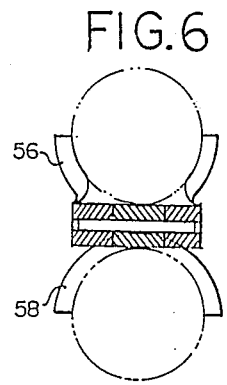
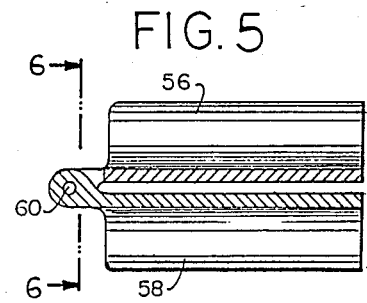
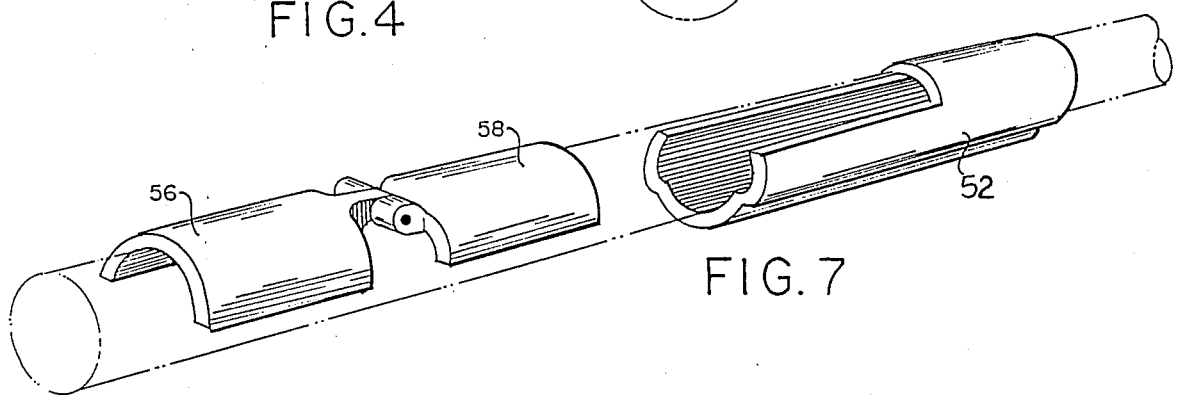
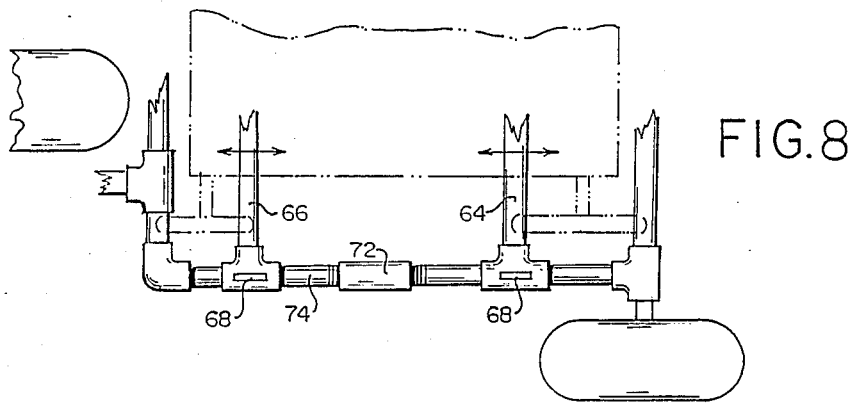
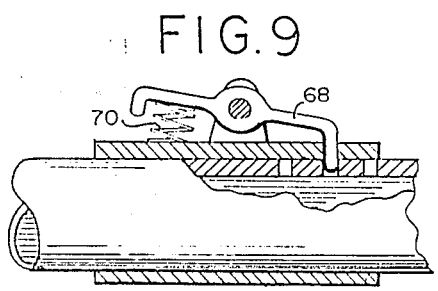
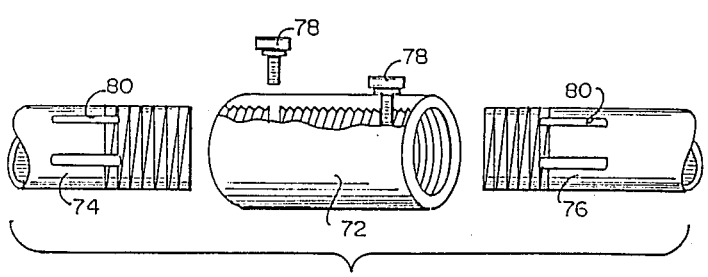

ALL TERRAIN DOLLY FOR WHEELED DEVICES

BACKGROUND OF THE INVENTION

1. Field of the Invention

This invention relates generally to a dolly for use on terrain providing poor bearing support such as sand, irregular surfaced lawns, etc., and more particularly to a dolly for carrying wheeled devices on such terrain.

Wheeled devices such as baby strollers, wheel chairs, toy wagons are typically equipped with narrow wheels and tires intended for use on pavement or floors having a relatively even, and solid surface. Such narrow wheeled devices have decreasing usefulness as the terrain becomes softer and more uneven. On the other hand, equipping such wheeled devices with broader wheels and tires would make them so cumbersome as to detract from their usefulness on the usual even and solid terrain.

2. Description of Related Art

U.S. Pat. No. 3,173,396, Bradov, entitled: "Child's Stroller", discloses a stroller having large drum like rollers at the front and rear for use in thick grass, in soft sand and over uneven terrain; and an outrigger arrangement for use in water. This special purpose device appears to have little utility for usual even and solid terrain.

U.S. Pat. No. 3,829,113, Epelbaum, entitled: "Adapter for Convertible Car Seat and Stroller", discloses a wheeled support for attaching to a car seat without wheels to make the car seat into a stroller. There is no suggestion that the wheeled support should support a stroller already having wheels.

SUMMARY OF THE INVENTION

A frame supported by wheels or wheel substitutes having large surface bearing area is equipped to removably support a device having wheels with insufficient surface bearing area, such as a stroller, so that the stroller can be conveniently maneuvered on terrain which is rough or provides inadequate support. The frame includes pairs of lateral framed members to support the device by its wheels or by its frame. Flexible wheels supports may extend between these pairs of lateral frame members to accommodate wheels of different diameters, and the spacing between the lateral frame members may be adjustable for the same purpose. The frame is preferably fabricated to permit folding or collapsing for storing and transporting.

It is therefore an object of this invention to provide an all terrain dolly upon which a device having wheels with insufficient surface bearing area for the terrain to be traversed can be supported.

It is also an object of this invention to fabricate such an all terrain dolly to support devices having wheels where the spacing between such wheels may be varied or the wheels may be of different diameters.

It is an additional object of this invention to provide such an all terrain dolly with a handle for propulsion.

It is also an object of this invention to provide an all terrain dolly which can be collapsed or folded when desired.

In accordance with these and other objects, which will become apparent hereafter, the instant invention will now be described with reference to the accompanying drawings.

BRIEF DESCRIPTION OF THE DRAWINGS

FIG. 4 is a detail showing a folding tube construction.

FIG. 5 is a cross-section taken on the line 5—5 of FIG. 4.

FIG. 6 is a cross-section taken on the line 6—6 of FIG. 5.

FIG. 7 shows a locking arrangement for a folding tube.

FIG. 8 shows an adjustable support arrangement for the wheels of a wheeled device to be supported.

FIG. 9 shows in cross-section a lock for the adjustable support of FIG. 8.

FIG. 10 shows in expanded view another adjustable arrangement for an all terrain dolly.

DETAILED DESCRIPTION OF THE INVENTION

Figure 1:
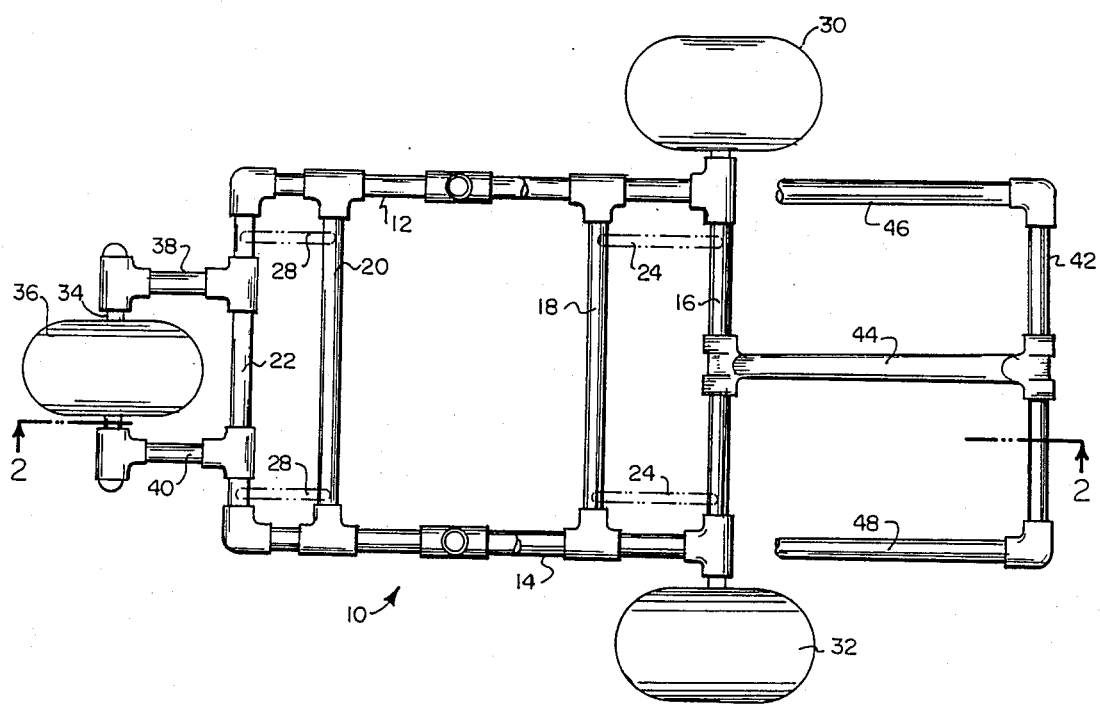
FIG. 1 is a plan view of an all terrain dolly in accordance with the invention having a portion of the handle cut away for clarity.
Figure 2:
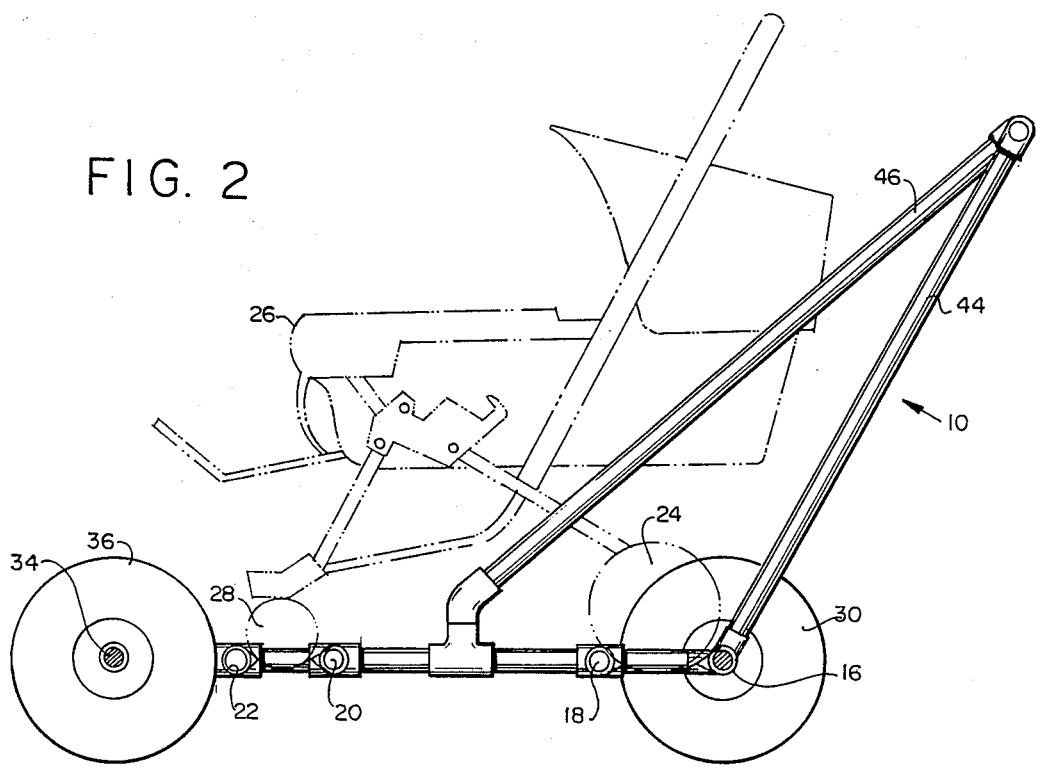
FIG. 2 is a side elevation of the dolly of FIG. 1 in cross-section taken on the line 2—2 of FIG. 1 and showing in phantom view a stroller being supported.

Referring to FIGS. 1 and 2, all terrain dolly 10 has spaced longitudinal frame members 12 and 14 and spaced lateral frame members 16, 18, 20 and 22. Lateral frame member 16 serves as the rear axle for dolly 10, and in combination with lateral frame member 18, serves as the support for the rear wheels 24 of the carriage 26 shown in phantom view in FIG. 2. Lateral frame members 20 and 22 serve as the support for the front wheels 28 of carriage 26. Dolly 10 is supported at the rear by large surface bearing area wheels 30 and 32 which are rotatably mounted on axle 16. At the front of dolly 10, axle 34 has large surface bearing area wheel 36 rotatably mounted thereon. Axle 34 is secured to longitudinal frame members 38 and 40.

Dolly 10 is propelled by handle 42 which is connected at its center to lateral frame member 16 by center handle support 44. Handle 42 has one end connected to longitudinal frame member 12 by end handle support 46, and the other end connected to longitudinal frame member 14 by end handle support 48.

If one attempted to push carriage 26 on a beach using the handle on the carriage, carriage wheels 24 and 28 would tend to embed themselves in the sand. Similarly, it would be difficult to push carriage 26 over rough terrain, snow or grass because the carriage wheels have insufficient surface bearing areas for such terrains. When carriage 26 is supported on all terrain dolly 10; however, it is readily moved over such terrains when propelled by handle 42 because of the large surface bearing area of the wheels of dolly 10.

Figure 3:
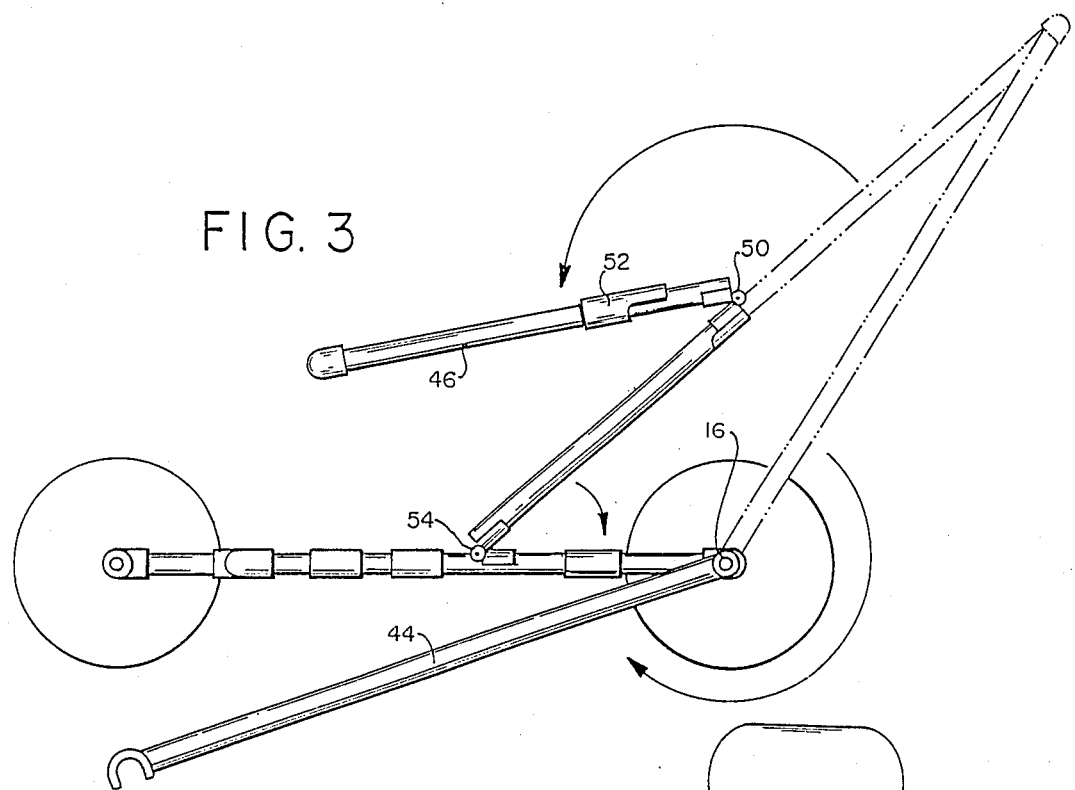
FIG. 3 shows a side elevation of a cross-section of an alternate embodiment of an all terrain dolly in accordance with the invention as it is being folded.
Figure 11:
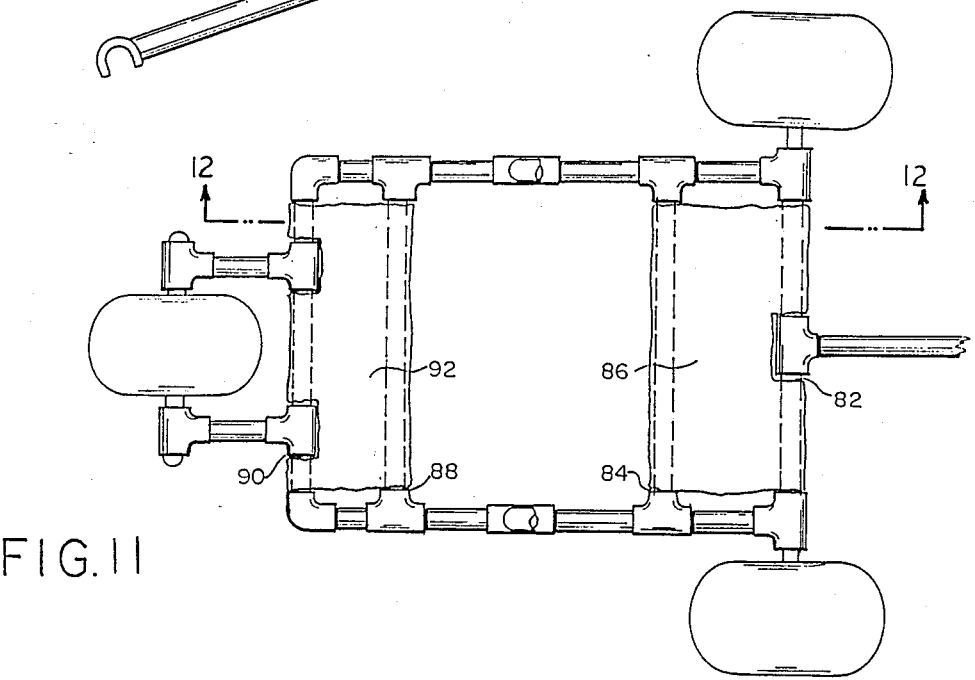
FIG. 11 shows a flexible support for the wheels of a wheeled device.
Figure 12:
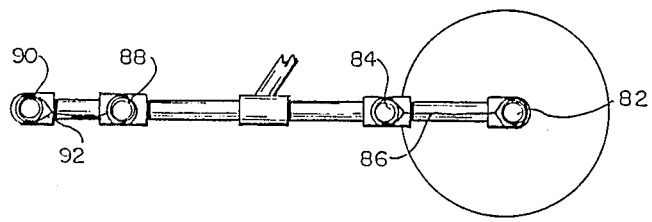
FIG. 12 is a cross-section taken on the line 12—12 of FIG. 11.

The all terrain dolly as described above may be fabricated to fold to a compact form when not in use. Referring to FIG. 3, center handle support 44 is rotatably mounted on lateral frame member 16 and detachably connected to handle 42 permitting it to be swung as indicated. End handle supports 46 and 48 include hinge 50 and a sleeve lock 52 which is slid into and out of locking position so as to permit these supports to be folded upon themselves. Hinge 54 permits the end handle supports to lie parallel to the longitudinal frame members.

FIGS. 4-6 show in more detail the semicylindrical hinge halves 56 and 58, which are secured to the frame members, and the hinge pin 60 which pivotally connects these elements. FIG. 5 shows these hinge halves in extended position with sleeve lock 52 in position to be slid into locking position.

It will be recognized that some variations will occur in wheel diameter and longitudinal spacing between wheels. As shown in FIGS. 6 and 7, lateral frame members 64 and 66 may be connected to the longitudinal frame members so as to be locked in different longitudinal positions. Pivoted lever 68 may be released by compressing spring 70 to change the position of these lateral frame members.

FIG. 8 shows the components of a turnbuckle 72 which may be positioned on longitudinal frame members 74 and 76 to change the effective length of the longitudinal frame. Set screws 78 cooperate with slots 80 to retain the turnbuckle in the desired position.

Turning now to FIGS. 9 and 10, an alternate embodiment of the invention having a different support arrangement for the wheels of the wheeled device will be described. Between lateral supports 82 and 84 a flexible rear wheel support 86 for the wheeled device is provided, and between lateral supports 88 and 90 a flexible front wheel support 92 for the wheeled device is provided. These flexible supports may be made of canvas or the like and stitched to form sleeves which will fit about the lateral supports or secured using other well known techniques. When lateral frame members 84 and 88 are slidably secured to the longitudinal frame members, these flexible supports will accomodate wheels having different diameters automatically.

The present invention has been built to support a carriage and has been used to carry the carriage on beaches; however, it is contemplated that similar dollies would support other devices having relatively small surface bearing area wheels such as wheel chairs. Moreover, it is contemplated that wheel substitutes such as tracks could be substituted for the large surface bearing area wheels as alternative movable supports for the dolly.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

I claim:

1. An all terrain dolly for supporting a vehicle with front wheels and rear wheels having insufficient surface bearing for a terrain to be traversed comprising:
   a front axle and a rear axle;
   at least one large surface bearing area wheel rotatably mounted on said front axle;
   a pair of large surface bearing area wheels rotatably mounted on said rear axle;
   longitudinally extending frame members having connections to said front and rear axles;
   said longitudinally extending frame members including longitudinal length adjustment means for changing the distance between said front and rear axles;
   a first laterally extending frame member adjacent to but spaced from said rear axle and connected at each end to said longitudinally extending frame members, whereby said first laterally extending frame member and said rear axle provide a means for supporting the rear wheels of the supported vehicle, wherein the rear wheels fit between and contact said laterally extending frame member and said rear axle;
   a pair of longitudinally spaced laterally extending frame members disposed adjacent to but spaced from said front axle and connected at each end to said longitudinally extending frame members, whereby said pair of longitudinally spaced laterally extending from members provide a means for supporting the front wheels of the supported veicle, wherein the front wheels fit between and contact said pair of longitudinally spaced laterally extending frame members;
   a laterally extending handle connected to said longitudinally extending frame members by a pair of handle supports.

2. An all terrain dolly for supporting a vehicle with wheels having insufficient surface bearing area for the terrain to be traversed in accordance with claim 1 wherein:
   at least one of said laterally extending frame members can be secured at different longitudinal positions.

3. An all terrain dolly for supporting a vehicle with wheels having insufficient surface bearing area for the terrain to be traversed in accordance with claim 1 wherein:
   said handle supports include hinges, whereby said handle supports can be folded.

4. An all terrain dolly for supporting a vehicle with wheels having insufficient surface bearing area for the terrain to be traversed in accordance with claim 1 further including:
   a flexible wheel support for supporting a vehicle with wheels;
   said flexible wheel support having a front end supported by one of said laterally extending frame members, and a back end supported by an adjacent laterally extending frame member.

5. An all terrain dolly for supporting a vehicle with wheels having insufficient surface bearing area for the terrain to be traversed in accordance with claim 1 further including:
   a third handle support having one end connected to said handle intermediate said pair of handle supports and another end connected to said rear axle.

6. An all terrain dolly for supporting a vehicle with wheels having insufficient surface bearing area for a terrain to be traversed comprising:
   a front axle and a rear axle;
   at least one large surface bearing area wheel rotatably mounted on said front axle;
   a pair of large surface bearing area wheels rotatably mounted on said rear axle;
   longitudinally extending frame members having connections to said front and rear axles;
   said longitudinally extending frame members including longitudinal length adjustment means for changing the distance between said front and rear axles;

a first laterally extending frame member adjacent to but spaced from said rear axle and connected at each end to said longitudinally extending frame members, whereby said first laterally extending frame member and said rear axle provide a means for supporting the rear wheels of the supported vehicle, wherein the rear wheels fit between and contact said laterally extending frame member and said rear axle;

a pair of longitudinally spaced laterally extending frame members disposed adjacent to but spaced from said front axle and connected at each end to said longitudinally extending frame members, whereby said pair of longitudinally spaced laterally extending frame members provide a means for supporting the front wheels of the supported vehicle, wherein the front wheels fit between and contact said pair of longitudinally spaced laterally extending frame members;

at least one of said laterally extending frame members being longitudinally adjustable;

a laterally extending handle connected to said longitudinally extending frame members by handle supports;

said handle supports include hinges, whereby said handle supports can be folded.

* * * * *

UNITED STATES PATENT AND TRADEMARK OFFICE
CERTIFICATE OF CORRECTION

PATENT NO. : 4,902,027

DATED : February 20, 1990

INVENTOR(S) : Billie J. Skelly

It is certified that error appears in the above-identified patent and that said Letters Patent is hereby corrected as shown below:

In column 4, line 17, replace the word "from" with the word -- frame --.

Signed and Sealed this

Twelfth Day of February, 1991

*Attest:*

HARRY F. MANBECK, JR.

*Attesting Officer*     *Commissioner of Patents and Trademarks*